US007233835B2

(12) United States Patent
Good et al.

(10) Patent No.: US 7,233,835 B2
(45) Date of Patent: Jun. 19, 2007

(54) METHOD AND SYSTEM FOR ESTIMATING A STATE OF AN UNINITIALIZED ADVANCED PROCESS CONTROLLER BY USING SEGREGATED CONTROLLER DATA

(75) Inventors: Richard Paul Good, Dresden (DE); Uwe Schulze, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/383,005

(22) Filed: May 12, 2006

(65) Prior Publication Data
US 2007/0027568 A1    Feb. 1, 2007

(30) Foreign Application Priority Data
Jul. 29, 2005  (DE)  .................... 10 2005 035 735

(51) Int. Cl.
*G06F 19/00* (2006.01)
(52) U.S. Cl. ................................... 700/108
(58) Field of Classification Search ................. 700/90, 700/95, 108, 109
See application file for complete search history.

(56) References Cited

U.S. PATENT DOCUMENTS 6,304,999 B1    10/2001  Toprac et al. .................. 716/4
2004/0102857 A1   5/2004  Markle et al. .................. 700/2
2006/0195213 A1*  8/2006  Wagner et al. .............. 700/108
2006/0271225 A1* 11/2006  Schulze et al. ............. 700/108
2007/0048635 A1*  3/2007  Schulze et al. ................ 430/30

FOREIGN PATENT DOCUMENTS

EP        1317694 B1 *  3/2002

OTHER PUBLICATIONS

Sarfaty et al. :Advance Process Control Solutions for Semiconductor Manufacturing, IEEE/SEMI Advanced Semiconducotr Manufactruing Conference, 2002 pp. 101-106.*

* cited by examiner

*Primary Examiner*—Zoila Cabrera
*Assistant Examiner*—Chad Rapp
(74) *Attorney, Agent, or Firm*—Williams, Morgan & Amerson, P.C.

(57) ABSTRACT

An APC controller is configured to operate on a segregated data structure during its normal operation and to establish a control state during an initializing event for a non-initialized manufacturing context on the basis of other initialized or non-initialized manufacturing contexts. Thus, the processing of pilot substrates may be reduced or the processing of the pilot substrates may be initiated on the basis of reliably established process parameters.

14 Claims, 2 Drawing Sheets

METHOD AND SYSTEM FOR ESTIMATING A STATE OF AN UNINITIALIZED ADVANCED PROCESS CONTROLLER BY USING SEGREGATED CONTROLLER DATA

BACKGROUND OF THE INVENTION

1. Field of the Invention

The present invention relates to the field of fabricating semiconductor devices, and, in particular, to advanced process control (APC) techniques for manufacturing processes, wherein an improved process control quality is achieved by adjusting process parameters on the basis of a process model, measurement data and information related to, for example, the product, the type of process, the process tool to be used and the like.

2. Description of the Related Art

Today's global market forces manufacturers of mass products to offer high quality products at a low price. It is thus important to improve yield and process efficiency to minimize production costs. This holds especially true in the field of semiconductor fabrication, since, here, it is essential to combine cutting edge technology with mass production techniques. It is, therefore, the goal of semiconductor manufacturers to reduce the consumption of raw materials and consumables while at the same time improve process tool utilization. The latter aspect is especially important, since, in modern semiconductor facilities, equipment is required which is extremely cost-intensive and represents the dominant part of the total product costs. For example, in manufacturing modern integrated circuits, 500 or more individual processes may be necessary to complete the integrated circuit, wherein failure in a single process step may result in a loss of the complete integrated circuit. This problem is even exacerbated in that the size of the substrate on which a plurality of such integrated circuits are processed steadily increases, so that failure in a single process step may entail the loss of a large number of products.

Therefore, the various manufacturing stages have to be thoroughly monitored to avoid undue waste of tool operation time and raw materials. Ideally, the effect of each individual process step on each substrate would be detected by measurement and the substrate under consideration would be released for further processing only if the required specifications were met. A corresponding process control, however, is not practical, since measuring the effects of certain processes may require relatively long measurement times or may even necessitate the destruction of the sample. Moreover, immense effort, in terms of time and equipment, would have to be made on the metrology side to provide the required measurement results. Additionally, utilization of the process tool would be minimized since the tool would be released only after the provision of the measurement result and its assessment.

The introduction of statistical methods, e.g., mean values, control charts, etc., for identifying out-of-control situations and adjusting process parameters significantly relaxes the above problem and allows a moderate utilization of the process tools while attaining a relatively high product yield. Nevertheless, in total, a large number of dummy substrates or pilot substrates may be necessary to adjust process parameters of respective process tools, wherein tolerable parameter drifts during the process have to be taken into consideration when designing a process sequence, since such parameter drifts may remain undetected over a long time period or may not be efficiently compensated for.

Recently, a process control strategy has been introduced, and is continuously being improved, allowing a high degree of process control, desirably on a run-to-run basis, with a moderate amount of measurement data. In this control strategy, so-called advanced process control, a model of a process or of a group of interrelated processes is established and implemented in an appropriately configured process controller. The process controller also receives information including pre-process measurement data and/or post-process measurement data as well as information related, for instance, to the substrate history, such as type of process or processes, the product type, the process tool or process tools in which the products are to be processed or have been processed in previous steps, the process recipe to be used, i.e., a set of required sub-steps for the process or processes under consideration, wherein possibly fixed process parameters and variable process parameters may be contained, and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration.

In complex APC algorithms, the measurement data contained in the information supplied to the APC algorithm, which may represent feedback and/or feedforward information, is typically organized in the form of a segregated structure. That is, based on the measurement data and any additional information, such as information on an upstream operation, the type of product, previously used process tools and the like, which may have an influence on the result of the process to be controlled, and on the basis of a respective process model, the APC algorithm determines the parameter setting to be used in the current process. Due to the various influences, such as the upstream operation, the product type and the like, the information supplied to the APC algorithm is "clustered" or segregated with the intention to use that information supplied to the APC algorithm such that it fits best the current process situation or condition of the process tool to be controlled.

With reference to FIGS. 1a-1b, an exemplary APC architecture may be described in more detail, wherein appropriately clustered or segregated data are used for defining respective control situations or manufacturing contexts for the APC algorithm.

In FIG. 1a, a typical portion of a manufacturing environment 100 is schematically illustrated, wherein the environment 100 may be configured to form resist features on semiconductor devices in a controlled fashion. For instance, the environment 100 may represent a manufacturing sequence required for establishing resist features for the formation of gate electrodes of transistor devices in advanced semiconductor devices. The environment 100 comprises a first photolithography tool S1, which is also referred to as a stepper, and a second photolithography tool S2, which are to be controlled by an APC algorithm implemented in a correspondingly configured controller 110. Moreover, a first and a second process tool for applying a photoresist on a substrate, referred to as P1 and P2, are provided and may represent upstream process tools, the operation of which may influence the performance of the steppers S1 and S2. Moreover, two different types of substrates, indicated as type A and type B, may be introduced into the environment 100 as a group of substrates, as individual substrates, and the like. Moreover, a metrology tool 120, for instance an optical instrument for estimating a line width of resist features, is provided and is operatively connected to the controller 110 so as to provide measurement results. Thus, the controller 110 and the metrology tool 120 establish a feedback control loop, in which current tool parameter settings for the steppers S1 and S2 are calculated on the basis of previously processed substrates. The controller 110 is further configured to receive additional information regarding the type of substrate, the process tools used, and reticles R1, R2 which may be used in the steppers S1 and S2.

During a typical manufacturing sequence in the environment 100, substrates A and B are processed in the resist coating tools P1 and P2 in conformity with process requirements as dictated by tool availability and the like. Thereafter, the substrates arrive at the steppers S1 and S2, the parameter settings of which are determined by respective process recipes, wherein the specific settings of any variable parameters, such as exposure dose and the like, are provided by the controller 110, which calculates, for instance, an appropriate exposure dose on the basis of the measurement results of previously processed substrates and the tool-specific information. When configuring the controller 110, a structure of the information supplied thereto may be established so as to estimate the state of a process to be performed in the tools S1 and S2 on the basis of information that is segregated according to this structure. For instance, for the APC algorithm of the controller 110, four items of relevance may have been identified, for which the following structure may have been established: first—upstream entity, that is, the resist coating tools P1 and P2; second—current entity, that is, the steppers S1 and S2; third—product type, that is substrates of the type A and B; and fourth—reticles R1 and R2 used in the steppers S1 and S2.

FIG. 1*b* schematically shows in a more convenient fashion a respective structure 130, wherein each item of the last row defines a respective manufacturing context. Hence, when the APC controller 110 is operating on the basis of this structure, there are sixteen different "types" of controller data, wherein each type is individually used for calculating the respective parameter setting for the steppers S1 or S2 for that specific manufacturing context that is associated with this individual set of controller data. In other words, the controller 110 may treat the measurement data obtained from the tool 120 differently for the sixteen end points of the structure shown in FIG. 1*b* so as to take into consideration the various process situations represented by the end points of the tree structure 130. Thus, during the processing of a plurality of substrates A and B in the environment 100, an increasing amount of metrology data is created, which is grouped or clustered into respective manufacturing contexts. That is, new substrates of the types A and B to be processed will receive the process settings, which are calculated by using only data from previously processed substrates that had the same values for all the items in the structure 130. When, for instance, one of the contexts, such as the context specified by the quadruple (P1, S2, B, R2) occurs for the first time or the last occurrence of this context is considered as being too long ago, the state of the context may not reliably be estimated due to missing data or aged data. Therefore, this context is typically initialized by running pilot substrates in order to obtain sufficient data to estimate the "actual" control state and to perform a control operation on the basis of data obtained by the pilot substrates. However, the processing of pilot substrates may be extremely costly and time consuming, thereby reducing throughput, tool utilization and, finally, profitability.

In view of the situation described above, there is a need for an enhanced technique in adapting APC algorithms while avoiding or at least reducing the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to an enhanced technique for controlling process tools by means of advanced process control (APC) algorithms, in which enhanced control efficiency may be accomplished for the estimation of a state of a manufacturing context that lacks sufficient context-specific information by using data related to other contexts. Due to the usage of information related to other contexts, the available APC algorithm measurement data may be "exploited" more efficiently, thereby reducing efforts for obtaining state estimates for rare or new manufacturing situations encountered in a manufacturing environment.

According to one illustrative embodiment of the present invention, a method comprises implementing a segregated data structure including a plurality of items in an APC controller, wherein each item of the segregated data structure represents a manufacturing context of a manufacturing environment controlled by the APC controller. The method further comprises determining a threshold criterion for at least one manufacturing context, wherein the threshold criterion indicates, when it is fulfilled, an insufficiency of data available for the at least one manufacturing context. Moreover, a current manufacturing context of a substrate to be processed in the manufacturing environment is compared by the APC controller with the at least one manufacturing context and the threshold criterion. Furthermore, when the current manufacturing context corresponds to the at least one manufacturing context and the threshold criterion is fulfilled, a controller state is estimated for the current manufacturing context on the basis of one or more of the plurality of manufacturing contexts other than the at least one manufacturing context.

According to another illustrative embodiment of the present invention, an APC controller comprises a memory unit that is configured to receive process-specific data and to store the process-specific data according to a segregated data structure comprising a plurality of items, each of which represents control data of a manufacturing context of a manufacturing environment that is controllable by the APC controller. The controller further comprises a state estimator configured to estimate a control state for a given manufacturing context on the basis of control data of the given manufacturing context. Additionally, a comparator is provided that is configured to determine whether or not a current manufacturing context is a non-initialized manufacturing context. Finally, the controller comprises a state initializing unit configured to estimate a control state of the current manufacturing context on the basis of control data of one or more manufacturing contexts other than the current manufacturing context, when the current manufacturing context is determined to be a non-initialized manufacturing context.

BRIEF DESCRIPTION OF THE DRAWINGS

The invention may be understood by reference to the following description taken in conjunction with the accompanying drawings, in which like reference numerals identify like elements, and in which:

FIG. 1b schematically shows the segregated data structure of the APC controller of FIG. 1a;

Figure 1A:
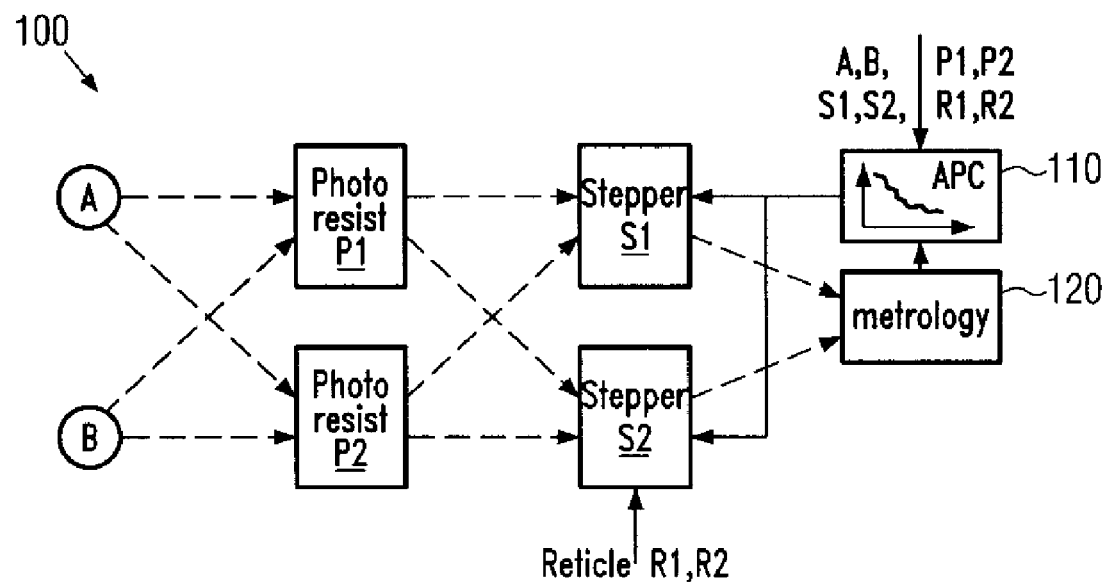
FIG. 1a schematically illustrates a manufacturing environment controlled by a prior art APC controller including a segregated data structure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention contemplates a more flexible handling of data created by complex APC algorithms including a segregated data structure that covers any process conditions, i.e., manufacturing contexts, in which data of previously processed products are collected to correspond to a specified manufacturing context. On the basis of such a segregated data structure, a desired degree of "resolution" with respect to the various process conditions may be established so that, for any specific manufacturing context, appropriate control data and other information related thereto may be used in determining an appropriate parameter setting, that is, an appropriate control state, for one or more of the process tools to be controlled within the manufacturing environment. Contrary to conventional APC controllers and control strategies operating on the basis of a segregated data structure, the present invention provides enhanced flexibility in that control data of other manufacturing contexts may be used in determining an appropriate control state for a specific manufacturing context, when the control data and control information available for the specific manufacturing context are insufficient for reliably determining a parameter setting on the basis of the conventional APC algorithm operated on the basis of the context-specific data. Consequently, any process situations in which an initialization or re-initialization of a control state for a specified manufacturing context is necessary, due to the non-availability of corresponding data or due to delayed control data, the processing of a plurality of pilot substrates may be avoided or more appropriate parameter settings for processing pilot substrates may be estimated on the basis of control data and information related to one or more other manufacturing contexts. Thus, relevant "pieces" of information implicitly contained in control data associated with other manufacturing contexts may efficiently be used for a current manufacturing context whose control data and information may not suffice so as to reliably estimate an updated control state.

For this reason, a large number of process situations, i.e., manufacturing contexts, may be covered by the APC algorithm and its segregated data structure while nevertheless efforts in terms of process time may be reduced as any initialization or re-initialization procedures may effectively be handled by using the available measurement data and other process related information more effectively. For example, substantially all manufacturing contexts may be taken into consideration when establishing a segregated data structure so that even very rare process situations and/or manufacturing contexts whose significance may vary over time may be taken into consideration when establishing an effective APC algorithm, since such manufacturing contexts may then be handled on the basis of control data and information that are actually associated with other manufacturing contexts. Thus, in addition to the very efficient handling of initialization and re-initialization procedures, the design engineer of the APC algorithm is given a high degree of flexibility, since any influences, that is, items or manufacturing contexts of the segregated data structure that may currently be considered relevant or which may be considered relevant in the future or the influence of which may vary over time, may also be taken into consideration without obtaining a significant deterioration of control efficiency.

It should be appreciated that in previous examples related to the conventional control strategy as well as in illustrative examples of the present invention, specified manufacturing environments may be referred to, for instance related to lithography processes and measurement data associated therewith, in order to provide illustrative examples of the principles of the present invention. It should be borne in mind, however, that the present invention may also be applied to any process or process sequence requiring sophisticated control mechanisms. For instance, during the formation of metallization layers in sophisticated semiconductor devices, frequently the so-called damascene technique is employed, in which a metal is deposited on a patterned dielectric layer, wherein, after the deposition, any excess metal usually has to be reliably removed. Since the removal process, typically comprising a chemical mechanical polishing (CMP) process, and the reliable deposition of metal, such as copper or copper alloy, are per se highly complex processes, an even increased complex control situation is encountered, since inherent process non-uniformities of the individual processes may have to be adjusted so as to accomplish a mutual compensation. To this end, a highly sensitive and reliable process control is required. Hereby, the overall control strategy may depend on a plurality of process-specific circumstances, such as the specific deposition tool used, the electrolyte solution used, specific tool configurations, such as the shape and configuration of a diffuser plate used in the electroplating tool, the status of consumables in individual CMP stations, and the like, wherein situations may occur, such as maintenance of a polishing head, or replacement of a polishing pad, the re-initialization of a plating tool, and the like, which may represent influences of temporary nature which, however, may at a given time have a significant influence on the control algorithm.

In such a complex control situation, on the one hand, a highly detailed segregated data structure may be desirable so as to efficiently estimate control states of specific manufacturing contexts, while on the other hand the processing of any pilot substrates or pilot lots may significantly reduce tool utilization and thus unduly increase process time and thus process costs. In this situation, the enhanced "usage or exploitation" of process data and information for any manufacturing contexts that are encountered for the first time or which have not been run for a long time, may provide a highly efficient initialization procedure while nevertheless provide moderately precise estimates for the parameter setting to be used for the non-initialized manufacturing context. Thus, even highly complex APC situations may be handled in a very efficient manner by using control data and information of at least a portion of the segregated data structure for any initialization or re-initialization procedures. Moreover, since the control state, i.e., the parameter setting used for controlling one or more process tools after the initialization of the respective controller thread, i.e., manufacturing context, is based on a plurality of actual measurement data that represent one or more contexts having at least a certain degree of "similarity" to the newly initialized context, any criteria for performing an initialization may be established in a more flexible manner compared to conventional APC algorithm strategies, for example, more restrictive initialization criteria may be selected, since any pilot substrate processing may be avoided or at least significantly reduced. As a consequence, unless otherwise stated in the specification and the appended claims, the present invention should not be restricted to any specific manufacturing environment and to the control of any specified process tools.

Figure 2A:
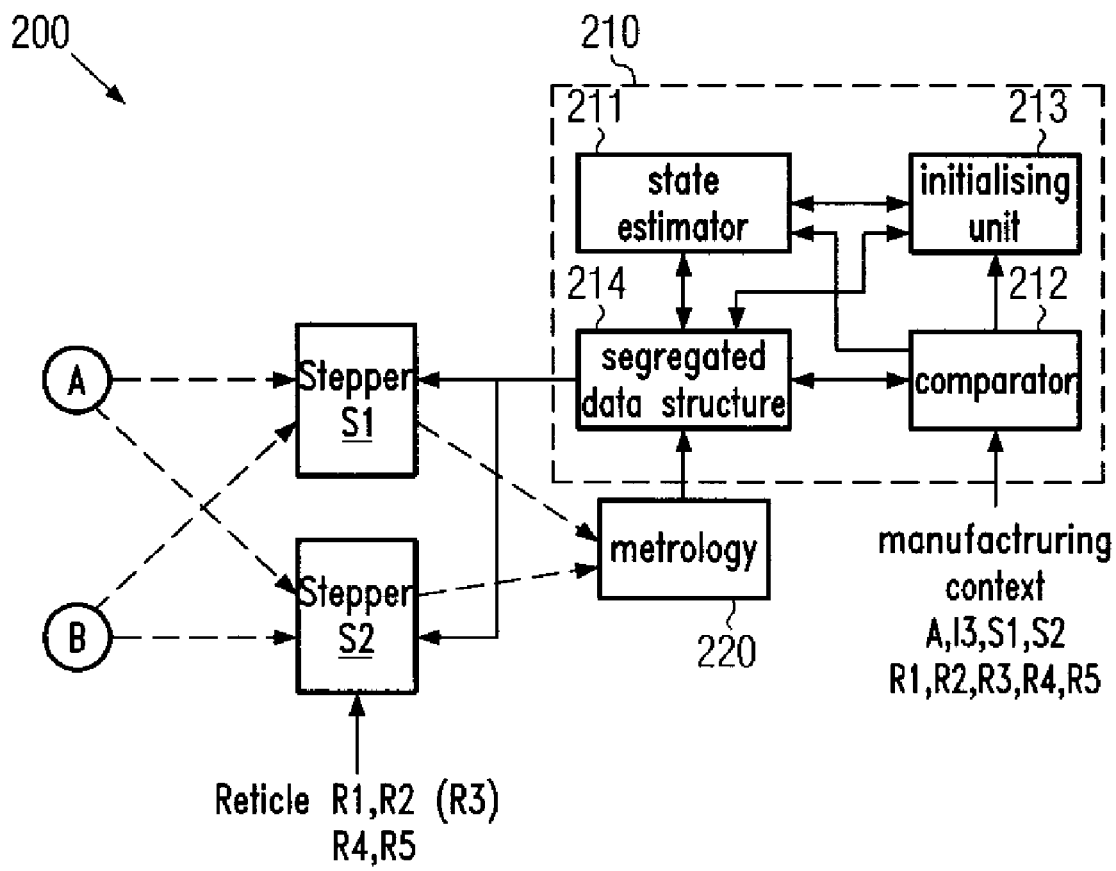
FIG. 2a schematically depicts a manufacturing environment controlled by an APC controller including a state initializing unit that operates on the basis of a plurality of items of a segregated data structure in accordance with illustrative embodiments of the present invention.
Figure 2B:
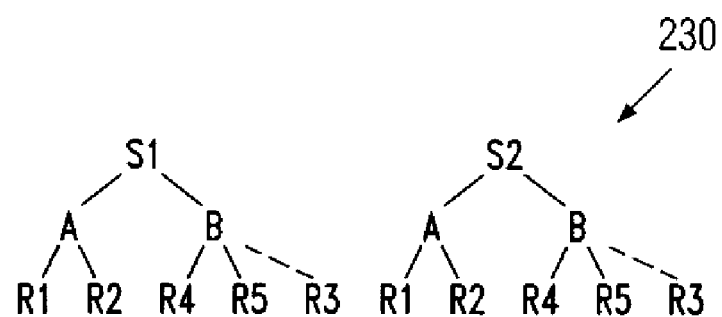
FIG. 2b schematically shows an example of a segregated data structure when used for the initialization of a non-initialized manufacturing context on the basis of control data associated with other manufacturing contexts.

With reference to FIGS. 2a and 2b, further illustrative embodiments of the present invention will now be described in more detail. FIG. 2a schematically shows a manufacturing environment 200, wherein, as previously explained, the environment 200 represents any manufacturing environment for the fabrication of semiconductor devices. For instance, typically, a plurality of individual processes of more or less complexity are required for the fabrication of semiconductor devices, wherein the manufacturing environment 200 may represent a specified portion of the entire semiconductor facility. The one or more processes to be performed within the manufacturing environment 200 are controlled on the basis of an advanced process control (APC) algorithm. In the exemplary embodiment shown in FIG. 2a, the manufacturing environment 200 may represent a portion of the manufacturing facility which is configured to form structural elements on substrates by means of photolithography. Therefore, in the exemplary environment 200, one or more illustrative process tools, for example, one or more lithography tools S1 and S2, which are also referred to as steppers, may be provided.

The one or more process tools S1 and S2 may be operatively connected to a controller 210 comprising a state estimator 211 having implemented therein an advanced process control algorithm designed to provide appropriate parameter settings for the one or more process tools S1 and S2 based on a specific process situation, i.e., on a specific manufacturing context. The manufacturing context is also associated with respective metrology data that are provided by a metrology tool 220 that is operatively connected to the controller 210 and is further operatively connected to a memory unit 214. The memory unit 214 has implemented therein a segregated data structure, as will be described with reference to FIG. 2b in more detail, comprising a plurality of items, each of which represents a specified process situation or manufacturing context with respect to the manufacturing environment 200. A process situation or manufacturing context may be considered as the set of individual process steps and events having an influence on the processes performed by the process tools S1 and S2, wherein the set of individual process steps and events is arranged according to segregated data structure, as will be described in more detail below, thereby taking into consideration the influence of the individual process steps and events on the control state established by the state estimator 211. Thus, each item of the segregated data structure implemented in the memory unit 214 represents a manufacturing context, which is also a "container" of control data and other process-related information associated with a specific manufacturing context. For instance, a specific manufacturing context may depend on the process tool used (since each process tool S1 and S2 may perform differently), the configuration of the tools S1 and S2, for instance in terms of reticle R1 . . . R5 used therein, the type of product to be processed in the environment 200, the minimum critical dimension of features to be formed on the various product types, any information with respect to preceding or subsequent processes and process tools to be used, and the like. Some or all of these characteristics may be used by the state estimator to calculate a control state that predicts a "correct" parameter setting for the tool S1 or S2 for the processing of a substrate, wherein the respective measurement data for the context under consideration reflect the "accuracy" of the preceding parameter setting with respect to obtaining a target process result, such as a target size of a circuit element.

The controller 210 further comprises a comparator unit 212 having implemented therein an algorithm for assessing a current manufacturing context with respect to a specified threshold criterion that specifies whether or not the current manufacturing context is to be regarded as a non-initialized manufacturing context. Hereby, a non-initialized context may be regarded as a context whose associated data may not suffice to provide a reliable prediction for the parameter setting required for processing a substrate corresponding to the context under consideration. The comparator unit 212 may further be configured to receive information that specifies the current manufacturing context for a substrate to be processed in the environment 200. Corresponding information may be provided, at least partially, directly by the process tools S1 and S2 and/or may be provided by a supervising manufacturing execution system (not shown), which may coordinate the process flow within the manufacturing environment 200.

Furthermore, the controller 210 further comprises a state initializing unit 213, which is operatively coupled to the comparator unit 212 and the memory unit 214 so as to access the segregated data structure implemented therein for retrieving any information that is related to at least one further manufacturing context other than a current manufacturing context. Moreover, the initializing unit 213 has implemented therein an appropriate algorithm for estimating a control state for at least one of the process tools S1 and S2 on the basis of the retrieved information. For this purpose, the state initializing unit 213 may be configured to identify a difference between the current manufacturing context and the one or more contexts for which information is retrieved from the memory unit 214. Moreover, the initializing unit 213 may be configured to determine the significance or contribution of the identified difference with respect to a state estimation for the current manufacturing context. Thus, the state initializing unit 213 is configured to provide a parameter setting for a non-initialized state corresponding to the current manufacturing context upon receipt of a corresponding indication from the comparator unit 212 that the current manufacturing context is to be considered as non-initialized.

Moreover, the manufacturing environment 200 may comprise a source of products, wherein for the sake of convenience only two types of products A, B are illustrated. For instance, the products A and B may represent substantially the same device design except for different speed grades of the circuitry. Consequently, slightly different reticles R1, R2, R3, R4 and R5 may be used in processing the product A, B so as to comply with the slightly different designs. For instance, it may be assumed that the product A may be processed on the basis of reticles R1 and R2, while product B may be processed on the basis of reticles R4, R5 and R3, wherein the latter one may only be optionally introduced into the process flow due to, for instance, a delayed availability or any other circumstances. Thus, in the illustrative embodiment shown in FIG. 2a, a manufacturing context may be defined by three parameters, such as the type of product used, the identity of the process tool used, and the identity of the reticle used in the various lithography tools. For convenience it is assumed that the metrology tool 220 may receive substrates processed in both process tools S1 and S2 so that the metrology tool 220 may not contribute to the complexity of the resulting segregated data structure, which is shown in more detail in FIG. 2b.

Prior to the operation of the controller 210 within the environment 200 according to an overall process strategy controlled by a supervising system (not shown), an appropriate APC algorithm may be established, wherein this APC algorithm enables the determination of appropriate parameter settings for the process tools S1 and S2 on the basis of measurement data and a model of the process to be controlled. Hence, the APC algorithm, for instance implemented in the state estimator 211, enables the control of the process tools S1 and S2 on the basis of a moderately low density of measurement data, since obtaining measurement data from each substrate processed in the tools S1 and S2 is typically not practical, as is explained above. Establishing an appropriate APC algorithm for estimating an updated control state by the state estimator 211 may be performed on the basis of well-established concepts, wherein the segregated data structure represents a plurality of different manufacturing contexts. As previously explained, a high degree of design flexibility is provided in that each manufacturing context that is expected to be relevant may be taken into consideration when establishing the segregated data structure, since an efficient state estimation may also be provided even if one or more of the manufacturing contexts lacks sufficient control data for providing a state estimate on the basis of the associated data. In this case, the initialization unit 213 may provide a reliable parameter setting for initializing or re-initializing the corresponding manufacturing contexts. In the above example, a manufacturing context including the optional reticle R3 may also be taken into consideration when establishing the segregated data structure, even though a high probability may exist that this manufacturing context may never occur or may be encountered only a few times. Thus, in some illustrative embodiments, substantially all reasonably anticipated manufacturing contexts may be taken into consideration, which may be considered relevant for any current or future configuration of the manufacturing environment 200.

FIG. 2b schematically shows a segregated data structure 230 including a plurality of items, each of which corresponds to a specific manufacturing context, wherein each item or manufacturing context is represented by a sequence ending at a respective end point of the tree structure shown in FIG. 2b. For example, a first manufacturing context may be specified by the triple (S1, A, R1) indicating that a substrate of type A is processed by the process tool S1 using the reticle R1. Similarly, a manufacturing context represented by the triple (S1, B, R3) may denote a product B that is processed by the process tool S1 using the reticle R3 that may only be available after a certain time interval so that this manufacturing context may not frequently be encountered during the processing of substrates A and B. Each manufacturing context in the segregated data structure 230 may therefore represent a "container" for metrology data provided by the tool 220 and other process-related information that is associated with the respective manufacturing context.

Figure 1B:
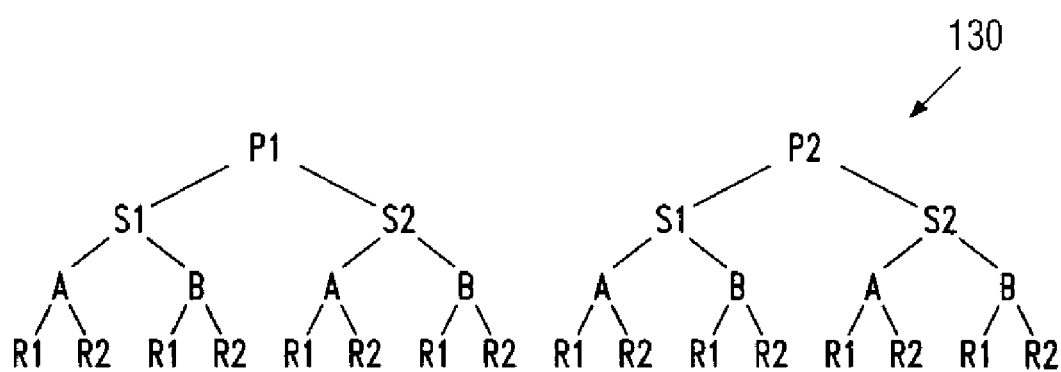

During the process flow through the manufacturing environment 200, the controller 210 may be initialized on the basis of currently available data and/or on the basis of other process-related criteria. For convenience, it may be assumed that the controller 210 currently operates on the segregated data structure 230, wherein, for all manufacturing contexts, except for contexts including the optional reticle R3, sufficient control data have already been obtained from the metrology tool 220 to reliably estimate a control state for each manufacturing context not including the reticle R3. For convenience, it may further be assumed that the reticle R3 is not yet in use or at the corresponding manufacturing context may have occurred with reduced frequency and thus the related metrology data are still insufficient for reliably estimating a control state. Thus, in a conventional APC strategy, such as is shown in FIGS. 1a and 1b when a current manufacturing context is identified as (S1, B, R3) or (S2, B, R3), the conventional controller would require an initialization of the corresponding manufacturing context, thereby requiring the processing of a plurality of pilot substrates corresponding to the current manufacturing context. For instance, if the context (S1, B, R3) occurs for the first time, a corresponding set of pilot substrates having features of the products of type B would have to be processed in the stepper S1 on the basis of the reticle R3. Contrary to this conventional strategy, the controller 210 identifies, on the basis of information supplied to the comparator unit 212, a current manufacturing context and also assesses whether or not the identified current manufacturing context is a non-initialized context or not. In the present example, the comparator unit 212 identifies the context (S1, B, R3) as a non-initialized context and instructs the initializing unit 213 to provide a parameter setting for the tool S1 on the basis of control data related to at least one manufacturing context other than the current manufacturing context. For identifying a current manufacturing context as a non-initialized context, the comparator unit 212 may have implemented therein a predefined criterion and/or any appropriate algorithm for establishing a well-defined threshold criterion on the basis of process specific information. In some illustrative embodiments, the comparator unit 212 may be configured to monitor the variance error of previous state initialization estimates so as to obtain a criterion for assessing the manufacturing context under consideration as non-initialized or not. For example, if previous state initializing estimates provided by the initializing unit 213 indicate a significant deviation with respect to the actual control state, which may be recognized on the basis of a significant deviation from a target value of the process under consideration, a specific criterion such as the time interval between two subsequent occurrences of the manufacturing context under consideration, may be redefined to reduce the discrepancy between the initialized state and the actual tool condition for future initialization events. On the other hand, if the variance error of previous state initialization estimates is low, any initialization events for manufacturing contexts of low frequency may correspondingly be reduced.

In other embodiments, the number of state estimates for known manufacturing contexts may be monitored by the comparator unit 212 to establish or adapt the specific criterion for causing a state initialization by the unit 213. That is, the number of state estimates for manufacturing contexts may be used as a measure of "process time" of the environment 200 and thus as a measure for a possible change of process conditions within the environment 200 so that a manufacturing context having associated therewith a small amount of metrology data may be assessed as non-initialized, thereby providing the potential for re-initializing the corresponding manufacturing context on the basis of most recent state estimates of other manufacturing contexts. In still other illustrative embodiments, the comparator unit 212 may be configured to monitor the frequency of state estimate updates of one or more specified known manufacturing contexts, which may then be used as a measure for determining an appropriate criterion for assessing the manufacturing context as non-initialized, as in the previous embodiment. In still another illustrative embodiment, the length of a time interval since the previous context initialization for the current manufacturing context may be used as a criterion for estimating whether or not the current manufacturing context is a non-initialized context. Moreover, one or more of the above-identified embodiments for providing or adapting a specified threshold criterion may be combined in order to decide whether or not a non-initialized manufacturing context has occurred.

It should be appreciated that the above-described embodiments regarding an appropriate algorithm in the comparator unit 212 for assessing the initialization status of a given manufacturing context use a simple "yes/no" decision, based on fulfilling or not fulfilling the established or predetermined criterion. In other illustrative embodiments, a more detailed analysis of the corresponding initialization status of a manufacturing context under consideration may be established on the basis of one or more of the above-described decision criteria. For example, a current manufacturing context may be classified as belonging to one or more different initialization classes, wherein for instance the first class may require an initialization on the basis of pilot substrates, for which a corresponding control state estimate may be established on the basis of control data obtained from the segregated data structure 230, wherein this data refers to one or more manufacturing contexts other than the manufacturing context under consideration. A second initialization class may relate to a less "restricted" initialization procedure, wherein for instance product substrates, such as the substrates corresponding to the product types A and B, may be assessed on the basis of an initialized state that is established on the basis of other manufacturing contexts. A third class may then represent an initialized context that is handled on the basis of its associated control data. Consequently, a significant process delay may be avoided for any manufacturing contexts that need to be initialized but may belong to the second initialization class, while, for members of the first initialization class, a highly efficient process run with pilot substrates may be initiated on the basis of appropriately established process parameters. For example, for the data structure 230 shown in FIG. 2b, the comparator unit 212 may detect a difference for the manufacturing context related to the stepper S1 compared to the stepper S2 so that a newly encountered manufacturing context defined by the reticle R3 processed in the stepper S1 may be assessed to require a different initialization procedure compared to the corresponding manufacturing context including R3 and performed in the stepper S2. For instance, the number of state estimates for products of type A and B processed in the stepper S1 may be significantly less compared to respective manufacturing contexts associated with the stepper S2, thereby rendering the additional data for manufacturing contexts relating to the stepper S2 more reliable. Thus, the manufacturing context (S2, B, R3) may be initialized on the basis of a state estimate without requiring the processing of any pilot substrates, while the manufacturing context (S1, B, R3) may require the usage of one or more pilot substrates, wherein, however, contrary to conventional approaches, the process parameters for the pilot substrates may be determined more appropriately on the basis of two or more additional manufacturing contexts, such as the contexts (S1, A, R1), (S1, B, R4), ... and the like.

Upon instructing the initializing unit 213 for a current manufacturing context that is assessed as non-initialized by the comparator unit 212, the unit 213 may establish an appropriate control state or may at least provide appropriate information to enable the state estimator 211 to obtain an appropriate initialization state for the process under consideration. For this purpose, in one illustrative embodiment, the initialization unit 213 may be configured to identify at least one difference for a current manufacturing context of the manufacturing environment 200 and one or more of the manufacturing contexts represented by the data structure 230 that do not coincide with the current manufacturing context. For example, the initializing unit 213 may be configured to determine a difference between the manufacturing context (S1, B, R3), which may be assumed to be the current manufacturing context for which the control 210 is to provide a control state, and one or more of the manufacturing contexts such as (S1, A, R1), (S1, B, R4), and the like, wherein it is assumed that the comparator unit 212 has identified manufacturing context (S1, B, R3) as a non-initialized context. In particular embodiments, the initializing unit 213 may be configured to identify a difference between any of the manufacturing contexts, irrespective of their current initialization class or status, thereby providing the potential for responding to any manufacturing context once this context has been identified as non-initialized. Moreover, the initializing unit 213 may further be configured to estimate an influence of the identified difference between one or more manufacturing contexts on a current manufacturing context under consideration. That is, if the context (S1, B, R3) has been identified as a non-initialized current manufacturing context, the initializing unit 213 may identify a difference with respect to, for instance, the context (S1, A, R1) and may also provide an algorithm for "translating" the corresponding measurement data and other process information stored in the segregated data structure of this context into appropriate data for establishing a control state for the current non-initialized context. For instance, an "averaged" parameter setting, i.e., control state or set of manipulated parameters of the tool S1, may be established by taking into consideration the plurality of manufacturing contexts related to the tool S1, wherein the corresponding manufacturing contexts may be weighted by a measure describing a deviation of actual measurement data from respective target values for each of these corresponding manufacturing contexts. For instance, if the manufacturing context (S1, B, R5) has recently been updated and exhibits a small discrepancy between the respective target value, such as a critical dimension of a resist feature, and the actually measured critical dimension, the corresponding influence or contribution of this manufacturing context in establishing an appropriate control state for the context (S1, B, R3) may be weighted more strongly compared to, for example, the context (S1, B, R4), which may have been updated not as frequently and/or which may exhibit a more pronounced deviation between the respective target value and the actual measurement data. It should be appreciated that other criteria for estimating an influence or contribution of a difference between the current non-initialized context and one or more other contexts may be used, such as the "similarity" of the respective contexts to the context under consideration, the variance error of previous state initialization estimates, the number of state estimates of the initialized contexts, the frequency of the state estimate updates for initialized contexts, the length of the time interval since the previous context update for the initialized contexts, and the like.

In other embodiments, a contribution or influence of characteristics or features not belonging to the manufacturing context under consideration may be determined by least squares regression and/or partial least squares regression and/or partial inverse via singular value decomposition analysis and/or partial inverse via orthogonal-triangular decomposition analysis and/or neural network models and/or commonality analysis, wherein these algorithms and analysis techniques are well-established in the field of control techniques. Thus, by using one or more of the above-identified analysis techniques, the initializing unit 213 may establish an appropriate control state, once a corresponding manufacturing context is identified as a non-initialized context, while the controller 210 may then transit to the regular APC controller operation as soon as a sufficient amount of metrology data and other process information are available for the newly initialized manufacturing context. Thus, the controller 210 may identify an initialization class or state of at least some of the manufacturing contexts of the structure 230, wherein this identification may be based on a predetermined criterion or may be based on a dynamically adapted criterion. Based on the comparison result of the comparator unit 212, the control unit 210 may then perform a regular APC control operation on the basis of segregated data or may effect an initialization or re-initialization on the basis of a portion or all of the data available in the data structure 230.

As a result, the present invention provides an enhanced technique for performing a model-based control operation of a manufacturing environment in that the control state of a manufacturing context that is identified as a non-initialized context is established on the basis of data from a segregated data structure, wherein at least some of the data used is related to other manufacturing contexts. Once sufficient data for the newly initialized manufacturing context is accumulated, the control operation may automatically transit into the regular APC control behavior, thereby operating on the basis of the data associated with the manufacturing context under consideration. Consequently, the processing of pilot substrates upon occurrence of a non-initialized manufacturing context may be avoided or may be significantly enhanced in that the corresponding parameter setting for processing the pilot substrates may be established on the basis of data available from other manufacturing contexts, thereby significantly enhancing the control efficiency of the controller and thus reducing the "settling time" for adapting to the newly initialized manufacturing context. In addition, a high degree of flexibility in designing an appropriate APC control strategy is provided, since a plurality of manufacturing contexts or even all of the expected manufacturing contexts may be taken into consideration when establishing a segregated status structure. The possibly increased number of manufacturing contexts may, however, not unduly increase process time due to a possibly increased number of initialization events, since, as previously explained, pilot substrates may not be necessary or the efficiency of using such pilot substrates may significantly be enhanced.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   implementing a segregated data structure including a plurality of items in an APC controller, each item of said segregated data structure representing a manufacturing context of a manufacturing environment controlled by said APC controller;
   determining a threshold criterion for at least one manufacturing context, said threshold criterion indicating, when fulfilled, an insufficiency of data available for said at least one manufacturing context;
   comparing, by said APC controller, a current manufacturing context of a substrate to be processed in said manufacturing environment with said threshold criterion; and
   when said current manufacturing context corresponds to said at least one manufacturing context and said threshold criterion is fulfilled, estimating a controller state for said current manufacturing context on the basis of one or more of the plurality of manufacturing contexts other than said at least one manufacturing context.

2. The method of claim 1, wherein estimating said controller state comprises determining at least one difference of said one or more of the manufacturing contexts with respect to said at least one manufacturing context and estimating a contribution of said at least one difference to said at least one manufacturing context.

3. The method of claim 2, wherein said at least one difference represents at least one of a difference in a process recipe, a different process tool of said manufacturing environment, a different product type, a difference in a minimum critical dimension and a difference in the process history.

4. The method of claim 1, further comprising determining, by said APC controller, a parameter setting of said manufacturing environment for said substrate on the basis of said current manufacturing context and said estimated controller state and processing said substrate using said determined parameter setting.

5. The method of claim 4, wherein a plurality of substrates having said current manufacturing context are processed on the basis of said determined parameter setting.

6. The method of claim 4, wherein said substrate is a product substrate.

7. The method of claim 4, wherein said substrate represents a pilot substrate and the method further comprises obtaining control data for said current manufacturing context from said processed pilot substrate.

8. The method of claim 1, further comprising estimating a controller state for said current manufacturing context on the basis of available data for said at least one manufacturing context when said criterion is not fulfilled.

9. The method of claim 2, wherein estimating a contribution of said at least one difference to said at least one manufacturing context comprises using, in said APC controller, at least one of the following algorithms: a least squares regression; a partial least squares regression; a partial inverse via singular value decomposition; a partial inverse via orthogonal-triangular decomposition; a neuronal network model; a commonality analysis; and any combination thereof.

10. The method of claim 1, wherein said threshold criterion is determined on the basis of at least one of: a variance error of previously estimated control states of manufacturing contexts that have been initialized on the basis of insufficient control data associated with a corresponding manufacturing context; a number of control state estimates for at least some of the plurality of manufacturing contexts; a frequency of control state updates for at least one of the plurality of manufacturing contexts; and a length of time since the last control state update for said at least one manufacturing context.

11. An APC controller, comprising:
a memory unit configured to receive process-specific data and to store said process-specific data according to a segregated data structure comprising a plurality of items, each of which represents control data of a manufacturing context of a manufacturing environment that is controllable by said APC controller;
a state estimator configured to estimate a control state for a given manufacturing context on the basis of control data of said given manufacturing context;
a comparator configured to determine whether or not a current manufacturing context is a non-initialized manufacturing context; and
a state initializing unit configured to estimate a control state of said current manufacturing context on the basis of control data of one or more manufacturing contexts other than said current manufacturing context when said current manufacturing context is determined to be a non-initialized manufacturing context.

12. The APC controller of claim 11, wherein said state initializing unit is further configured to determine at least one difference of said one or more manufacturing contexts with respect to said current manufacturing context and to estimate a contribution of said at least one difference to said current manufacturing context.

13. The APC controller of claim 11, wherein said state initializing unit has implemented at least one of the following algorithms: a least squares regression; a partial least squares regression; a partial inverse via singular value decomposition; a partial inverse via orthogonal-triangular decomposition; a neuronal network model; a commonality analysis; and any combination thereof.

14. The APC controller of claim 11, wherein said comparator is configured to determine whether or not a current manufacturing context is a non-initialized manufacturing context on the basis of at least one of: a variance error of previously initialized control states of manufacturing contexts; a number of control state estimates for at least some of the plurality of manufacturing contexts; a frequency of control state updates for at least one of the plurality of manufacturing contexts; and a length of time since the last control state update for said at least one manufacturing context.

* * * * *